United States Patent
Wang et al.

(10) Patent No.: US 11,550,540 B2
(45) Date of Patent: Jan. 10, 2023

(54) CONTENT INPUT SELECTION AND SWITCHING

(71) Applicant: Lenovo (Singapore) Pte. Ltd., Singapore (SG)

(72) Inventors: Song Wang, Cary, NC (US); Mengnan Wang, Chapel Hill, NC (US); Ming Qian, Cary, NC (US); David Alexander Schwarz, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/541,505

(22) Filed: Aug. 15, 2019

(65) Prior Publication Data

US 2021/0048979 A1 Feb. 18, 2021

(51) Int. Cl.
| | |
|---|---|
| *G06F 3/16* | (2006.01) |
| *G06F 3/0482* | (2013.01) |
| *G06F 3/04845* | (2022.01) |
| *G06F 3/04886* | (2022.01) |

(52) U.S. Cl.
CPC ............ *G06F 3/167* (2013.01); *G06F 3/0482* (2013.01); *G06F 3/04845* (2013.01); *G06F 3/04886* (2013.01)

(58) Field of Classification Search
CPC .... G06F 3/167; G06F 3/0482; G06F 3/04845; G06F 3/0488; G10K 11/17823; G10K 2210/3011
See application file for complete search history.

(56) References Cited

U.S. PATENT DOCUMENTS

| | | | | |
|---|---|---|---|---|
| 2006/0015812 | A1* | 1/2006 | Cunningham | G06F 40/166 715/263 |
| 2009/0253463 | A1* | 10/2009 | Shin | H04M 1/72583 455/563 |
| 2010/0269040 | A1* | 10/2010 | Lee | G06F 3/04817 715/702 |
| 2012/0051561 | A1* | 3/2012 | Cohen | G10L 21/00 381/122 |
| 2013/0019175 | A1* | 1/2013 | Kotler | G06F 3/0482 715/728 |
| 2013/0019206 | A1* | 1/2013 | Kotler | G06F 3/04812 715/834 |
| 2014/0075388 | A1* | 3/2014 | Kuscher | G06F 3/0482 715/834 |

(Continued)

*Primary Examiner* — Mandrita Brahmachari
(74) *Attorney, Agent, or Firm* — Ference & Associates LLC

(57) ABSTRACT

One embodiment provides a method, including: detecting user activation input provided to a voice input button displayed on a display screen of an information handling device, wherein the user activation input triggers a voice input mode; expanding, responsive to the detecting, a voice input menu, wherein the voice input menu comprises at least two content input options; identifying a selection of one of the at least two content input options; receiving, after the identifying, voice input; converting the voice input into another input type, wherein the another input type is designated by the selection; and providing, based on the converting, input associated with the another input type into an underlying application. Other aspects are described and claimed.

18 Claims, 5 Drawing Sheets

(56) References Cited

U.S. PATENT DOCUMENTS

2016/0205049 A1* 7/2016 Kim .................. H04L 51/046
                                                      455/414.1
2019/0079668 A1* 3/2019 Rao .................. G06F 3/04886

* cited by examiner

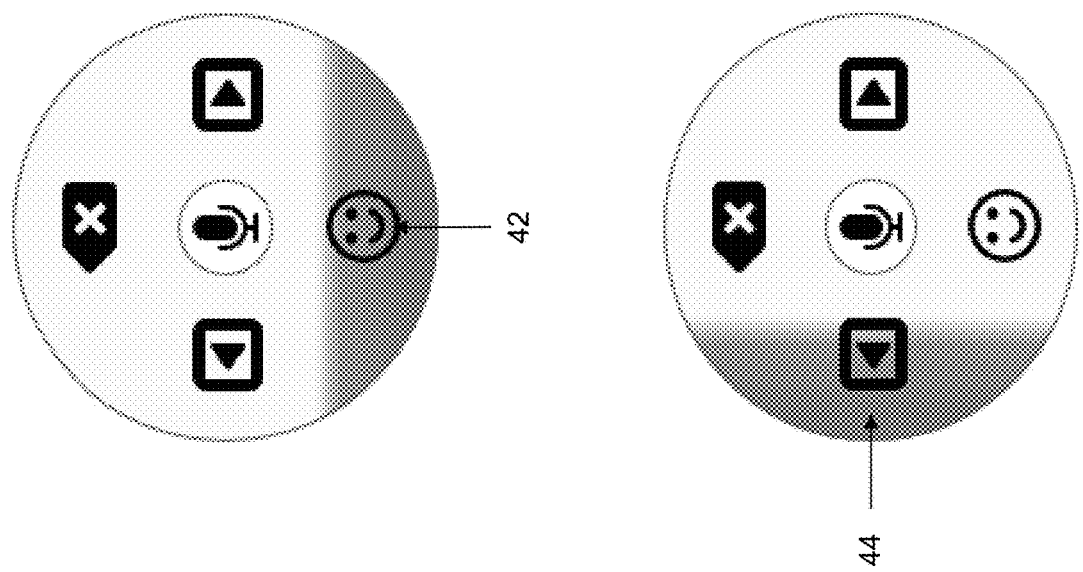
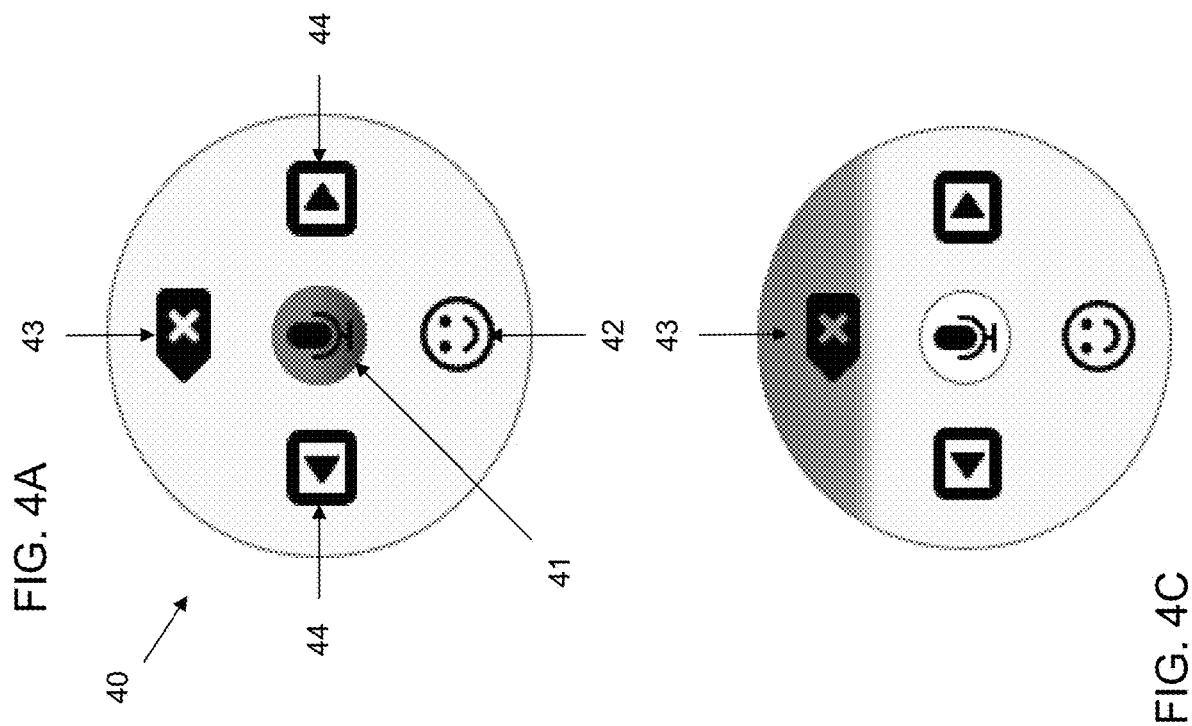

Selection: Press Text-Based Input Button
Voice Input: "It is a great day today"
Result: It is a great day today

FIG. 5A

Selection: Press Text-Based Input Button → Move Finger Down To Symbol-Based Input Button
Voice Input: "It is a great day today" "smiley face"
Result: It is a great day today ☺

FIG. 5B

Selection: Text-Based Input Button → Symbol-Based Input Button → Text-Based Input Button
Voice Input: "Awesome" "smiley face" "I'm looking forward to it"
Result: Awesome ☺ I'm looking forward to it

FIG. 5C

CONTENT INPUT SELECTION AND SWITCHING

BACKGROUND

Individuals frequently utilize their information handling devices ("devices"), for example, smart phones, tablet devices, laptop and/or personal computers, and the like, to construct documents and/or to communicate with other individuals. Many applications (e.g., word processing applications, social media applications, email applications, text messaging applications, etc.) are capable of receiving and processing various types of user input. For example, by using a text messaging application a user may be able to construct a message comprising both text-based input and emoticon input that they may thereafter transmit to another individual.

BRIEF SUMMARY

In summary, one aspect provides a method, comprising: detecting user activation input provided to a voice input button displayed on a display screen of an information handling device, wherein the user activation input triggers a voice input mode; expanding, responsive to the detecting, a voice input menu, wherein the voice input menu comprises at least two content input options; identifying a selection of one of the at least two content input options; receiving, after the identifying, voice input; converting the voice input into another input type, wherein the another input type is designated by the selection; and providing, based on the converting, input associated with the another input type into an underlying application.

Another aspect provides an information handling device, comprising: a display screen; a processor; a memory device that stores instructions executable by the processor to: detect user activation input provided to a voice input button, wherein the user activation input triggers a voice input mode; expand, responsive to the detecting, a voice input menu, wherein the voice input menu comprises at least two content input options; identify a selection of one of the at least two content input options; receive, after the identifying, voice input; converting the voice input into another input type, wherein the another input type is designated by the selection; and providing, based on the converting, input associated with the another input type into an underlying application.

A further aspect provides a product, comprising: a storage device that stores code, the code being executable by a processor and comprising: code that detects user activation input provided to a voice input button, wherein the user activation input triggers a voice input mode; code that expands, responsive to the detecting, a voice input menu, wherein the voice input menu comprises at least two content input options; code that identifies a selection of one of the at least two content input options; code that receives, after the identifying, voice input; code that converts the voice input into another input type, wherein the another input type is designated by the selection; and code that provides, based on the converting, input associated with the another input type into an underlying application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIGS. 4(A-D) illustrate a non-limiting example embodiment of an expanded voice input menu.

FIGS. 5(A-C) illustrate non-limiting input method examples of the embodiments.

DETAILED DESCRIPTION

Figure 1:
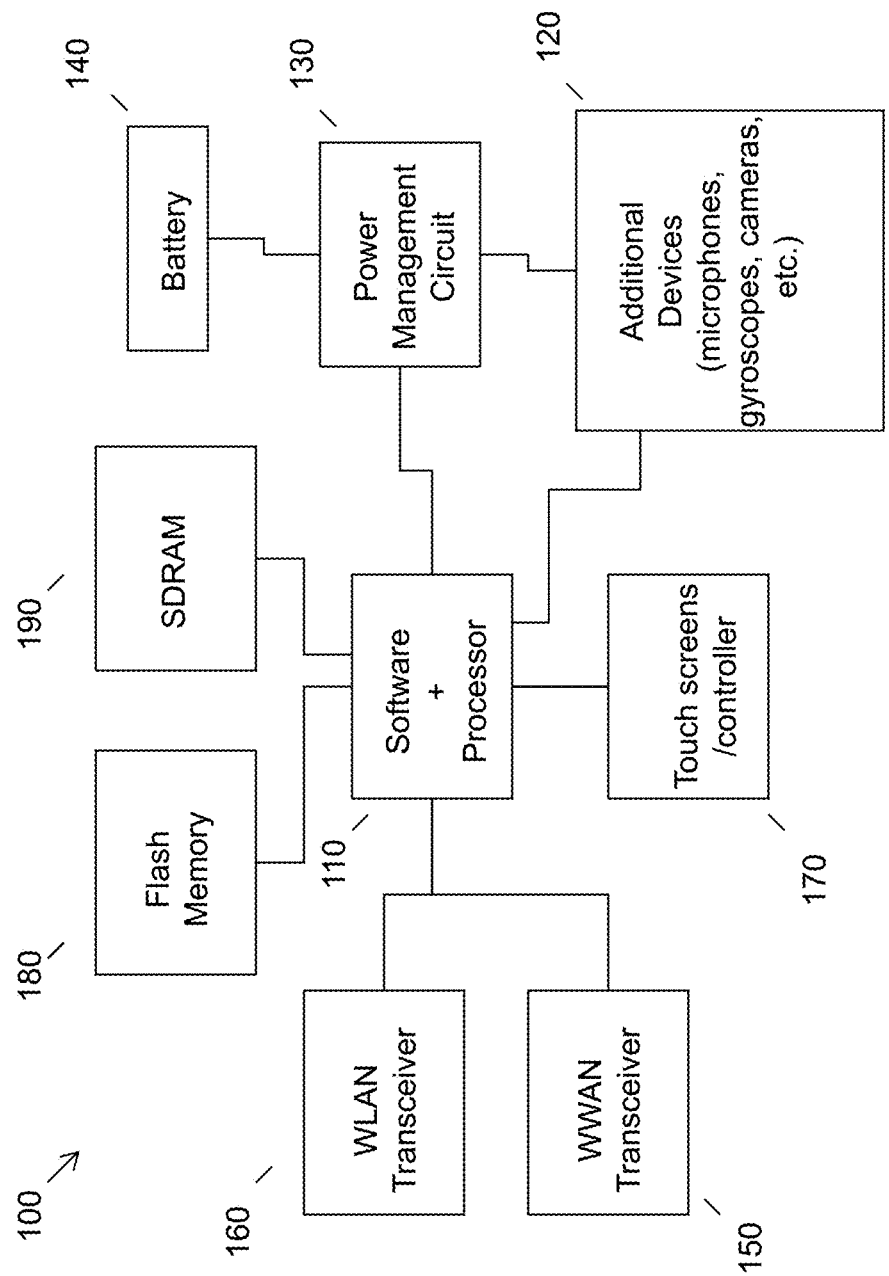
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology has advanced, fewer devices maintain an integrated, physical keyboard. More particularly, most modern devices (e.g., smart phones, tablets, etc.) accept user input (e.g., touch input, stylus input, etc.) via a touch-sensitive display screen. Although the touch-sensitive display may afford a user a variety of different benefits, the lack of a keyboard makes it more challenging for a user to type text or to enter non-hot key defined symbols or emoticons.

No solutions presently exist that provide an interactive and efficient way to create text and symbol input on modern devices with high accuracy and speed. More particularly, as an example, a user wanting to provide the combination text+emoticon input "Hi! ☺ How are you doing today?" would need to first type the salutation, then toggle through one or more menus to find a desired emoticon, and thereafter toggle back to a text input menu. The foregoing process may be time-consuming and burdensome. Although voice input transcription may be utilized as an effective method of providing text input to an application, existing voice input technology cannot differentiate between a user's desire to input text or symbol input.

Accordingly, an embodiment provides a method for easily identifying and switching between content input modes. In an embodiment, user activation input may be detected on a voice input button. The user activation input may trigger a voice input mode. Responsive to the detection, a voice input menu may be expanded that comprises, inter alia, at least two content input options. One of the content input options may correspond to text-based input whereas another of the content input options may correspond to symbol-based input. An embodiment may then identify a selection of one of the content input options (e.g., by identifying a user's press and hold on the desired content input option, etc.) and thereafter detect voice input while the desired content input option is selected. Thereafter, an embodiment may convert the voice input into an input type associated with the selected content input option and then provide that input into an underlying application. A user may switch to a different input mode by sliding their finger or stylus over to another content input option. Subsequent voice input provided while another input option is selected may be converted into a corresponding input type and provided to an underlying application. Such a method may allow a user to easily transition between content input modes and quickly provide different types of input (e.g., text input, symbol input, etc.) to an underlying application.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
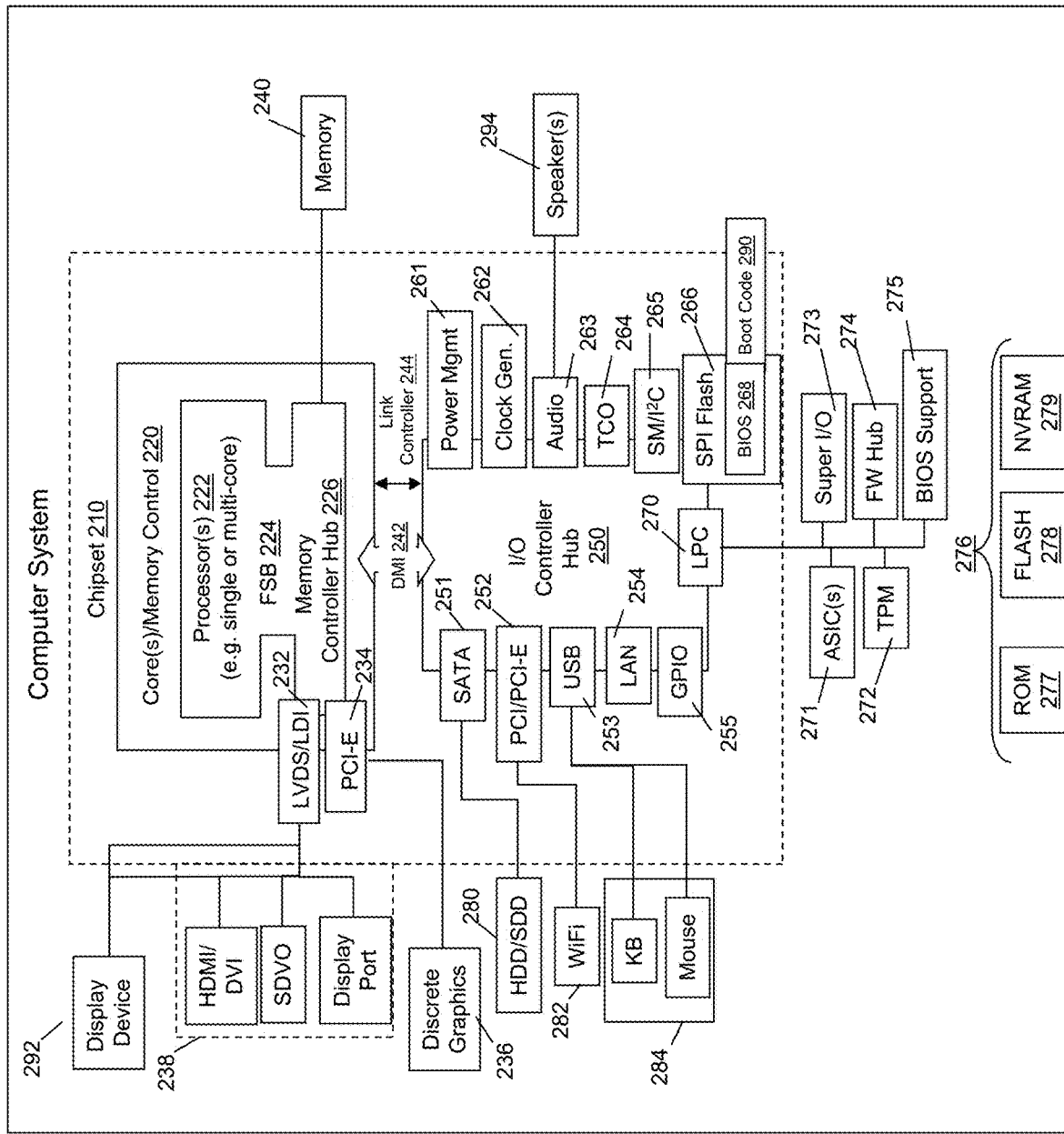
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of displaying content on a display screen and capable of accepting voice input. For example, the circuitry outlined in FIG. 1 may be implemented in a smart phone embodiment, whereas the circuitry outlined in FIG. 2 may be implemented in a laptop.

Figure 3:
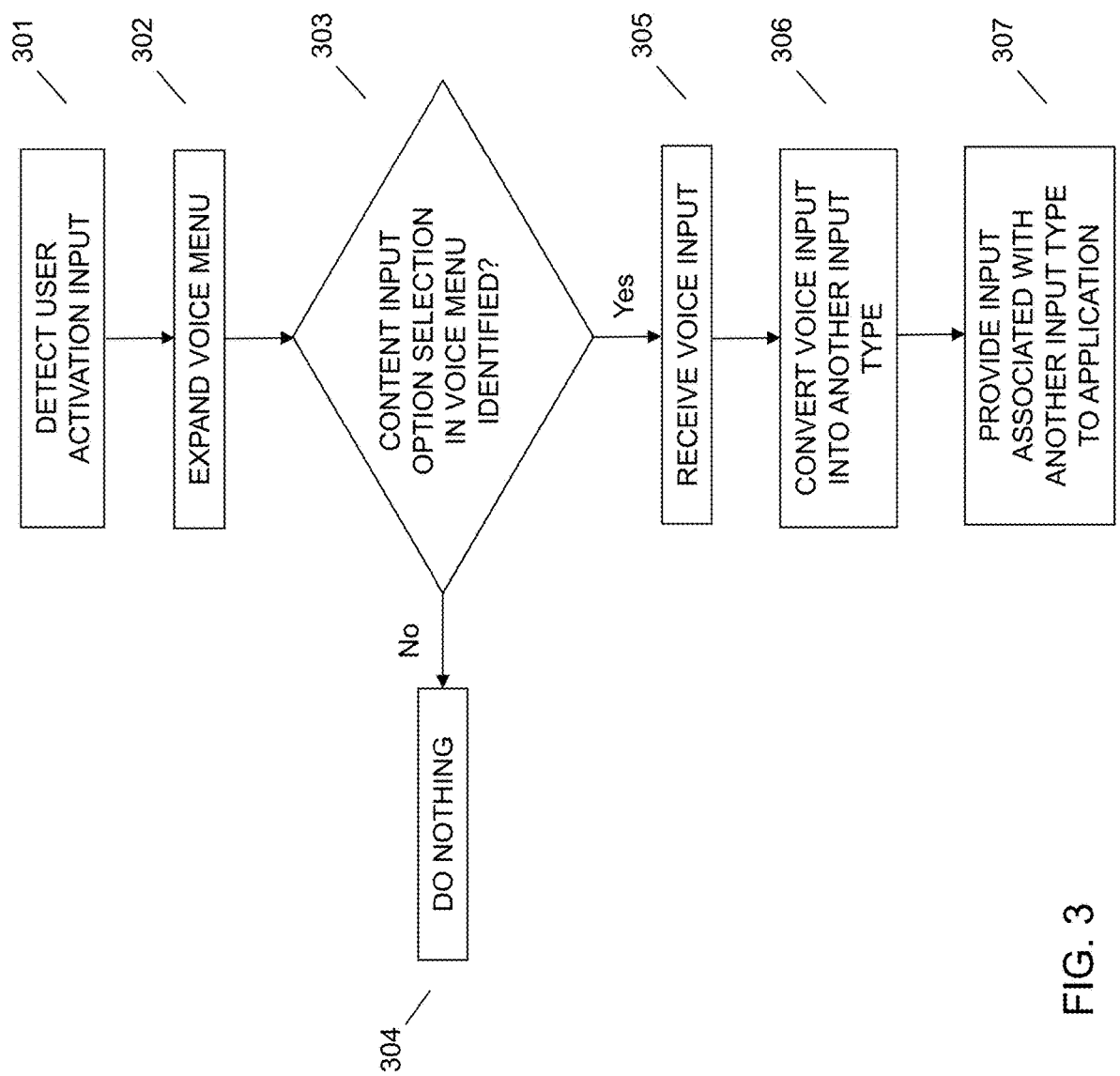
FIG. 3 illustrates an example method of selecting and switching between content input forms.

Referring now to FIG. 3, an embodiment may provide a user with a convenient and simple method for switching between input types. At 301, an embodiment may detect user activation input provided to a voice input button. In an embodiment, the voice input button ("button") may be displayed on a display screen of a device. The original position of the button may be designated by a user or may be based upon an underlying application. In an embodiment, the user activation input may correspond to a single press of the button (e.g., by a finger or stylus, etc.) or may correspond to a press and hold of the button.

In an embodiment, if no user activation input has been detected on the button for a predetermined period of time, an embodiment may initiate an inactive mode. While in the inactive mode, a visual characteristic of the button may be adjusted (e.g., the button may be grayed out or become transparent, etc.). Additionally or alternatively, the button may be repositioned (i.e., by a user) to virtually any other point on the screen (e.g., by dragging with a finger or stylus, etc.). After any form of interaction (e.g., dragging input, pressing input, etc.), the button may return to an active state. When returned to the active state the button may be recolored and/or its position may be fixed.

At 302, an embodiment may expand a voice input menu in response to the user activation input. The voice input menu ("menu") may be expanded at a location proximate to the button. For example, the menu may contain the button and may be expanded around it. In an embodiment, the menu may also contain at least two content input options. Each content input option may enable a user to provide a particular form of input to an application. For example, a text-based content input option may allow a user to provide text input to an underlying application whereas a symbol-based content input option may allow a user to provide symbol input (e.g., signs, symbols, emoticons, etc.) to an underlying application. The menu may also comprise other types of buttons such as a delete button, one or more directional cursor buttons (e.g., to move a cursor left, right, up, down through text, etc.), other types of input buttons, and the like.

A non-limiting example implementation of a voice input menu is illustrated in FIG. 4A. As can be seen from the figure, a menu 40 is presented that is circular in shape and is expanded around the button 41. The menu 40 comprises a plurality of other buttons and options. More particularly, the menu 40 comprises a symbol-based content input option 42 (e.g., to facilitate voice-to-symbol input, etc.), a delete button 43, and two directional cursor buttons 44. The button 41 itself may also be representative of a text-based content input option (e.g., to facilitate voice-to-text input, etc.). It is important to note that the illustrated embodiment of the menu described above is not limiting and a skilled person will realize that a menu of the embodiments may be of a different shape or size, may comprise fewer or additional buttons and/or content input options, etc.

At 303, an embodiment may identify a selection of one of the content input options. In an embodiment, the selection may be facilitated through various selection means (e.g., gaze selection, press-and-hold selection, etc.). More particularly, one of the content input options may be considered selected as long as it is being interacted with by the user (e.g., looked at it by a user, pressed and held by the user, etc.). For simplicity purposes, the remainder of this application will be discussed with reference to press-and-hold selection, however, this designation is not limiting.

In an embodiment, the selected content input option may be visually distinguished (e.g., changed to a different color from the other buttons or options in the menu, etc.). For example, referring again to FIG. 4A, the voice input button 41, which may also doubles as the text-based content input option, is selected. The voice input button 41 can be seen as being a different color than the other unselected buttons or options in the menu 40.

In an embodiment, a user may switch their selection by sliding their finger or stylus to another content input option or another button displayed on the menu. For example, a user may switch their selection from the text-based content input option 41 in FIG. 4A to the symbol-based content input option 42 in FIG. 4B by sliding their finger downwards. Once the symbol-based content input option 42 is selected, it may be visually distinguished from the remainder of buttons and options in the menu. Correspondingly, the text-based content input option 41 may lose its visual distinction when not selected. Additionally or alternatively, a user may select another type of button (e.g., a delete button, a directional cursor button, etc.) by moving/sliding their finger or stylus to the desired button. For example, at FIG. 4C, if a user slides their finger to the top most position, the delete button 43 may be selected and visually distinguished. Similarly, if a user desired to move their cursor position to the left, the user may drag their finger to the left most direction cursor button, as illustrated in FIG. 4D. The close proximity of content input options and other buttons displayed on the menu may allow a user to easily transition between different selections.

Responsive to not identifying, at 303, a selection, an embodiment may, at 304, take no additional action. Conversely, responsive to identifying, at 303, a selection, an embodiment may, at 305, receive voice input from the user. The voice input may be captured by an audio capture device (e.g., a microphone, etc.) that is integrally or operatively coupled to the device. In an embodiment, the voice input may be utilized in conjunction with a selected content input option to convert, at 306, the voice input to another input type. Thereafter, input associated with the other input type may be provided, at 307, to an underlying application.

Referring now to FIG. 5(A-C), a plurality of example implementations of the foregoing concepts are illustrated. At FIG. 5A, if a text-based content input option is selected and a user provides the voice input "It is a great day today" then an embodiment may convert the audible statement into corresponding text input. At FIG. 5B, if a user wishes to add an emoticon to the end of foregoing statement, then the user may swipe their finger down to the symbol content input option and provide the voice input "smiley face". An embodiment may correlate the user's voice input to a stored emoticon and provide the corresponding emoticon in-line with the transcribed voice input. At FIG. 5C, a user may switch between the content input options while forming a particular input. For instance, a user may first select the text-based content input option and provide the voice input "Awesome", which is correspondingly transcribed into an underlying application. A user may then select the symbol content input option and provide the voice input "smiley face", which is correspondingly converted into a smiley face emoticon following the transcribed word. A user may subsequently transfer back up to the text-based content input option and provide the voice input "I'm looking forward to it". The resulting completed input may thereafter appear as illustrated at 69. At 604, if a user desires to delete a word or symbol, they may simply position a cursor after a word or symbol they want to delete and thereafter drag their finger up to the delete button.

The various embodiments described herein thus represent a technical improvement to conventional methods of switching between content input types. Using the techniques described herein, an embodiment may detect activation of a voice input button and thereafter expand a menu proximate to or around the button. An embodiment may then identify a selection of a content input option and subsequently detect voice input provided while a content input option is selected. Responsive to receiving this voice input, an embodiment may convert the voice input to another type to be provided to an underlying application. The input type that the voce input is converted to is based at least in part on the selection of the content input option. Such a method provides a user with a simple and intuitive way for switching between various input modes.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting user activation input provided to a voice input button displayed on a display screen of an information handling device, wherein the user activation input triggers a voice input mode, wherein the user activation input comprises pressing and holding the voice input button for a duration of time during provision of a voice input;
    expanding, responsive to the detecting and for the duration of time, a voice input menu proximate to the voice input button and on the display of the information handling device, wherein the voice input menu comprises at least two content input options, wherein each of the at least two content input options corresponds to a different form of input provided into an underlying application converted from voice input, wherein the voice input menu further comprises at least two function options: a delete button and a cursor adjustment button pair;
    identifying a selection by the user of one of the at least two content input options, wherein the selection comprises the user interacting with the one of the at least two content input options, wherein the identifying comprises visually distinguishing the selected one content input option from the other of the at least two content input options, wherein the visually distinguishing the selected one content input option comprises identifying the selected one content input the user is interacting with and displaying a visual distinction on the menu associated with the selected content input option, and transitioning, upon the user selecting another of the at least two content input types on the menu, the visually distinguished selected one content input to the another of the at least two content input types and displaying the visual distinction associated with the selected another content input option on the menu, wherein the transitioning the visually distinguished selected one content input to the another content input comprises removing a visual distinction from the selected one content input as the user selects the another of the at least two content inputs;

receiving, while the user is interacting with the one of the at least two content input options and after the selection of an input option is identified, the voice input;

converting the voice input into another input type, wherein the another input type corresponds to the form of input of the selected one of the at least two input options, wherein the another input type is produced while the user is interacting with the one of the at least two content input options, wherein the converting comprises converting the voice input into a third input type upon the user selecting and continuously interacting with another of the at least two content input options during receipt of the voice input;

providing, based on the converting, input associated with the converted voice input into the underlying application;

identifying a selection by the user of one of the function options, wherein the selection comprises the user interacting with the one of the function options; and providing, based upon the selection, the function corresponding to the selected function option into the underlining application, without further user input.

2. The method of claim 1, wherein one of the at least two voice content input options corresponds to text input and wherein another of the at least two content input options corresponds to symbol input.

3. The method of claim 2, wherein the symbol input comprises emoticon input.

4. The method of claim 1, wherein the user activation input is associated with a touch-based hold of the voice input button.

5. The method of claim 1, wherein the selection comprises a touch-based hold on the one of the at least two content input options.

6. The method of claim 1, further comprising:
identifying, after the providing, selection of another of the at least two content input options;
receiving voice input during the selection;
converting the voice input into an input type associated with the another of the at least two content input options; and
providing input associated with the input type associated with the another of the at least two content input options into the underlying application in-line with the input associated with the another input type.

7. The method of claim 1, further comprising initiating an inactive mode of the voice input button when no interaction input has been received for a predetermined period of time.

8. The method of claim 7, wherein the voice input button in the inactive mode is movable around the display screen.

9. The method of claim 1, wherein a position of the voice input menu is fixed during expansion.

10. An information handling device, comprising:
a display screen;
a processor;
a memory device that stores instructions executable by the processor to:
detect user activation input provided to a voice input button, wherein the user activation input triggers a voice input mode, wherein the user activation input comprises pressing and holding the voice input button for a duration of time during provision of a voice input;
expand, responsive to the detecting and on the display of the information handling device and for the duration of time, a voice input menu, wherein the voice input menu comprises at least two content input options, wherein each of the at least two content input options corresponds to a different form of input provided into an underlying application converted from voice input, wherein the voice input menu further comprises at least two function options: a delete button and a cursor adjustment button pair;
identify a selection by the user of one of the at least two content input options, wherein the selection comprises the user interacting with the one of the at least two content input options, wherein the identifying comprises visually distinguishing the selected one content input option from the other of the at least two content input options, wherein the visually distinguishing the selected one content input option comprises identifying the selected one content input the user is interacting with and displaying a visual distinction on the menu associated with the selected content input option, and transitioning, upon the user selecting another of the at least two content input types on the menu, the visually distinguished selected one content input to the another of the at least two content input types and displaying the visual distinction associated with the selected another content input option on the menu, wherein the transitioning the visually distinguished selected one content input to the another content input comprises removing a visual distinction from the selected one content input as the user selects the another of the at least two content inputs;
receive, while the user is interacting with the one of the at least two content input options and after the selection of an input option is identified, the voice input;
converting the voice input into another input type, wherein the another input type corresponds to the form of input of the selected one of the at least two input options, wherein the another input type is produced while the user is interacting with the one of the at least two content input options, wherein the converting comprises converting the voice input into a third input type upon the user selecting and continuously interacting with another of the at least two content input options during receipt of the voice input;
providing, based on the converting, input associated with the converted voice input into the underlying application;
identify a selection by the user of one of the function options, wherein the selection comprises the user interacting with the one of the function options; and
provide, based upon the selection, the function corresponding to the selected function option into the underlining application, without further user input.

11. The information handling device of claim 10, wherein one of the at least two voice content input options corresponds to text input and wherein another of the at least two content input options corresponds to symbol input.

12. The information handling device of claim 10, wherein the user activation input is associated with a touch-based hold of the voice input button.

13. The information handling device of claim 10, wherein the selection comprises a touch-based hold on the one of the at least two content input options.

14. The information handling device of claim 10, wherein the instructions are further executable by the processor to:
identify, after the providing, selection of another of the at least two content input options;
receive voice input during the selection;
convert the voice input into an input type associated with the another of the at least two content input options; and
provide input associated with the input type associated with the another of the at least two content input options into the underlying application in-line with the input associated with the another input type.

15. The information handling device of claim 10, wherein the instructions are further executable by the processor to initiate an inactive mode of the voice input button when no interaction input has been received for a predetermined period of time.

16. The information handling device of claim 15, wherein the voice input button in the inactive mode is movable around the display screen.

17. The information handling device of claim 10, wherein a position of the voice input menu is fixed during expansion.

18. A product, comprising:
a processor and a storage device that stores code, the code being executable by the processor and comprising:
code that detects user activation input provided to a voice input button, wherein the user activation input triggers a voice input mode, wherein the user activation input comprises pressing and holding the voice input button for a duration of time during provision of a voice input;
code that expands, responsive to the detecting and on the display of the information handling device and for the duration of time, a voice input menu, wherein the voice input menu comprises at least two content input options, wherein each of the at least two content input options corresponds to a different form of input provided into an underlying application converted from voice input, wherein the voice input menu further comprises at least two function options: a delete button and a cursor adjustment button pair;
code that identifies a selection by the user of one of the at least two content input options, wherein the selection comprises the user interacting with the one of the at least two content input options, wherein the identifying comprises visually distinguishing the selected one content input option from the other of the at least two content input options, wherein the visually distinguishing the selected one content input option comprises identifying the selected one content input the user is interacting with and displaying a visual distinction on the menu associated with the selected content input option, and transitioning, upon the user selecting another of the at least two content input types on the menu, the visually distinguished selected one content input to the another of the at least two content input types and displaying the visual distinction associated with the selected another content input option on the menu, wherein the transitioning the visually distinguished selected one content input to the another content input comprises removing a visual distinction from the selected one content input as the user selects the another of the at least two content inputs;
code that receives, while the user is interacting with the one of the at least two content input options and after the selection of an input option is identified, the voice input;
code that converts the voice input into another input type, wherein the another input type corresponds to the form of input of the selected one of the at least two input options, wherein the another input type is produced while the user is interacting with the one of the at least two content input options, wherein the converting comprises converting the voice input into a third input type upon the user selecting and continuously interacting with another of the at least two content input options during receipt of the voice input;
code that provides, based on the converting, input associated with the converted voice input into an underlying application;
code that identifies a selection by the user of one of the function options, wherein the selection comprises the user interacting with the one of the function options; and
code that provides, based upon the selection, the function corresponding to the selected function option into the underlining application, without further user input.

* * * * *